United States Patent [19]

Nielsen et al.

[11] Patent Number: 4,807,341

[45] Date of Patent: Feb. 28, 1989

[54] TONER FUSING ROLL COVERED WITH CROSSLINKED ELASTOMERIC SILOXANE COPOLYMER CONTAINING DIPHENYLSILOXANE RECURRING UNITS AND METHOD OF PREPARATION

[75] Inventors: Paul L. Nielsen, Rochester; Joseph A. Pavlisko, Pittsford, both of N.Y.

[73] Assignee: Eastman Kodak Company, Rochester, N.Y.

[21] Appl. No.: 107,601

[22] Filed: Oct. 13, 1987

[51] Int. Cl.[4] .................................................. C08K 3/36

[52] U.S. Cl. ........................................ 29/132; 430/99; 118/60; 427/380; 428/450; 428/35.8; 428/36.91

[58] Field of Search .............. 430/99; 118/60; 29/132; 427/380; 428/36, 450

[56] References Cited

U.S. PATENT DOCUMENTS

| | | | |
|---|---|---|---|
| 3,795,033 | 3/1974 | Donnelly et al. . | |
| 4,360,566 | 11/1982 | Shimizu et al. . | |
| 4,430,406 | 2/1984 | Newkirk et al. . | |
| 4,515,884 | 5/1985 | Field et al. . | |
| 4,603,087 | 7/1986 | Ema | 29/132 X |
| 4,719,130 | 1/1988 | Shimizu | 29/132 X |

FOREIGN PATENT DOCUMENTS

| | | |
|---|---|---|
| 59-209129 | 11/1984 | Japan . |
| 62-003987 | 1/1987 | Japan . |
| 62-003988 | 1/1987 | Japan . |

OTHER PUBLICATIONS

Gilbert and Kantor, "Transient Catalysts for the Polymerization of Organosiloxanes", *J. Poly. Sci.,* vol. XL, pp. 35–58 (1959).

*Primary Examiner*—J. David Welsh

*Attorney, Agent, or Firm*—David F. Janci

[57] ABSTRACT

Toner fusing rolls with improved properties comprise cylindrical cores covered with crosslinked poly(diorganosiloxanes) having 5–15 mole percent diphenylsiloxane recurring units. The rolls are produced by molding and curing the uncrosslinked polysiloxanes on cylindrical cores.

4 Claims, No Drawings

TONER FUSING ROLL COVERED WITH CROSSLINKED ELASTOMERIC SILOXANE COPOLYMER CONTAINING DIPHENYLSILOXANE RECURRING UNITS AND METHOD OF PREPARATION

FIELD OF THE INVENTION

This invention relates to rolls useful for fusing heat-softenable toner material to a substrate and to methods for their preparation. More particularly, the invention concerns fusing rolls covered with crosslinked elastomeric siloxane copolymers and their preparation by molding and curing an appropriate copolymer on a cylindrical core.

BACKGROUND

In certain electrostatographic imaging and recording processes, for instance, in electrophotographic copying processes, an electrostatic latent image formed on a photoconductive surface is developed with a thermoplastic toner powder which is thereafter fused to a substrate. The fusion step commonly consists of passing the substrate, such as a sheet of paper on which toner powder is distributed in an imagewise pattern, through the nip of a pair of rolls. At least one of the rolls is heated and has a resilient surface. A persistent problem in this operation is that when the toner is heated during passage through the rolls it may tend to adhere not only to the paper but also to the fusing roll which contacts it. Any toner remaining adhered to the roll can cause a false offset image to appear on the next sheet that passes through the rolls and can also degrade the fusing performance of the roll.

To prevent toner offset many expedients have been tried such as covering the rolls with fluorocarbon polymers or silicone polymers of low surface energy. Also, poly(dimethylsiloxane) (also referred to as PDMS) oils have been applied as release liquids to the roll surfaces. With such materials, however, problems can occur.

One problem is that fluorocarbon polymers are difficult to wet with PDMS release oils, and the application of excessive amounts of such oils to roll surfaces in order to achieve sufficient roll-surface wetting, can cause oil stains on the paper to which toner is being fused.

A major problem is the effect that the PDMS release liquids can have on the fusing roll. Although PDMS oils aid in preventing toner build-up on the rolls, they cause another problem, because they are compatible with poly(dimethylsiloxane) rubbers that are widely used as fusing roll covers. The poly(dimethylsiloxane) oils are absorbed by the poly(dimethylsiloxane) covering of the rolls upon repeated use and cause swelling of the rolls.

Because of the swelling of the rolls, certain defects appear in thermally fixed images. In particular, "step patterns" appear in the images when using various copy sheet sizes. These result from the differential swelling of the fuser roll inside and outside of the paper with, which causes nonuniform roll compression when different sizes of copy paper are used. There can also be increased wear on the roll and shortened useful fusing roll life, because of softening of the roll surface and degrading interaction of PDMS oil with the core or with adhesive interlayers.

Another fault of poly(dimethylsiloxane) rubber polymers is that they provide fuser roll covers having a lower than desirable degree of thermal conductivity, which leads to inefficient heating of the fuser roll and inefficient heating of the toner to be fused. Also, if the fuser roll is internally heated, inefficiencies in heating can require use of high heating temperatures that can contribute to shorter fuser roll life by causing thermal degradation, especially at the interface of the fuser roll core and cover.

U.S. Pat. No. 4,430,406, discloses that fusing roll swelling can be controlled by spraying a fluorocarbon elastomer overcoat on the silicone elastomer roll cover. This method is costly, however, and only partially solves the problem.

U.S. Pat. No. 4,515,884 discloses the use of a release oil having a viscosity in the range from 7,000 to 20,000 centistokes, which allegedly reduces the problem. Even these materials, however, can lead to step patterns in the images.

Because of the swelling problems encountered with poly(dimethylsiloxane) fusing roll covers, it has been suggested in Japanese Kokai No. 59-209129, published Nov. 27, 1984, to make the roll covering from polymers containing some methylphenylsiloxane repeating units. Such polymers would perhaps be less compatible with poly(dimethylsiloxane) oils and hence less subject to swelling. Unfortunately, such polymers can degrade during preparation or use to yield siloxane compounds having single phenyl groups attached to silicon, which have been shown to exhibit estrogenic and sterility effects, making them undesirable for human contact.

It would be desirable to be able to fashion a fusing roll having an outer covering that provides all the benefits of poly(dimethylsiloxane) roll coverings and is also more thermally conductive, is more resistant to swelling by PDMS release oils, is thermally stable, and cannot yield estrogenic degradation products. The present invention provides such a fusing roll and a method for making it.

SUMMARY OF THE INVENTION

The present invention provides a roll useful for fusing heat-softenable toner material to a substrate. The roll comprises a cylindrical core having an outer covering comprising a crosslinked elastomeric siloxane copolymer comprising a major proportion of dimethylsiloxane recurring units, from 5 to 15 mole percent diphenylsiloxane recurring units, and more than 0 but less than 5 mole percent vinyl-addition-crosslinked siloxane recurring units.

The invention also provides a method of making the inventive roll comprising:

A. preparing a mixture comprising:

(1) a polymer comprising a major proportion of dimethylsiloxane recurring units, from 5 to 15 mole percent diphenylsiloxane recurring units, and more than 0 but less than 5 mole percent vinyl-siloxane recurring units, and having a weight average molecular weight from about 300,000 to about 500,000 and (2) a free radical initiator useful for crosslinking the polymer through the vinyl moieties;

B. molding, with application of heat thereto, a covering of the mixture on the outer surface of a cylindrical core, the heat being sufficient to cause some crosslinking through the vinyl moieties; and C. applying heat to the covering to complete the crosslinking of the polymer through the vinyl moieties.

Important advantages of the polymeric coverings of the fusing rolls of the invention are that they are resistant to swelling by PDMS release oils, they are thermally stable, they have a higher degree of thermal conductivity than known poly(dimethylsiloxane) coverings, and they do not degrade to form estrogenic methylphenylsiloxane compounds.

DESCRIPTION OF PREFERRED EMBODIMENTS

The base polymers which are precursors for the crosslinked elastomers in the covers of the rolls of the invention can be prepared by the copolymerization of the appropriate monomers using known polymerization catalysts and procedures as described, for example, in Gilbert and Kantor, "Transient Catalysts for the Polymerization of Organosiloxanes", *J. Poly. Sci.*, Vol. XL, pp. 35–58 (1959).

Suitable monomers for the base polymer include any monomers which yield the dimethylsiloxane, diphenylsiloxane, and vinylsiloxane repeating units in proper proportions when treated with an appropriate catalyst under polymerization conditions. These include both linear and cyclic monomers containing dimethylsiloxane, diphenylsiloxane, or vinylsiloxane (e.g., methylvinylsiloxane) groups. A preferred monomer for providing the dimethylsiloxane units is octamethylcyclotetrasiloxane. A preferred monomer for providing the diphenylsiloxane units is octophenylcyclotetrasiloxane.

In general, any crosslinking monomer containing vinylsiloxane groups can be used. The crosslinking monomers form internal and/or endcapping vinylsiloxane units in the base polymer, through which the polymer is crosslinked during the subsequent curing stage. Examples of preferred crosslinking monomers include 1,3-divinyltetramethyldisiloxane, 1,3,5,7-tetramethyl-1,3,5,7-tetravinylcyclotetrasiloxane, 1,3-divinyl-1,3-diphenyl-1,3-dimethyldisiloxane, and 1,3-divinyltetraphenyldisiloxane.

The proportion of diphenylsiloxane units in the polymer can vary from about 5 to 15 mole percent, depending on the desired physical characteristics. For instance, if a relatively hard (but still resilient) elastomeric roll cover is desired, the proportion of diphenylsiloxane units can be in the range of 13 to 15 mole percent and if a softer roll is desired, the diphenylsiloxane units can be in the range of 5 to 12 mole percent. The optimum proportion of diphenylsiloxane units is about 8 to 12 mole percent for some applications.

The proportion of vinylsiloxane cross-linkable units in the base polymer can vary from more than 0 to less than 5 mole percent of the total structural units of the polymer, also depending on the desired physical characteristics. For instance, if a relatively hard roll covering is desired, the proportion of vinylsiloxane units can be more than 1 to less than 5 mole percent, and if a softer roll is desired, the proportion of vinylsiloxane units can be in the range of more than 0 to about 1 mole percent. The optimum proportion of vinylsiloxane units is from 0.2 to 0.5 mole percent for some applications.

Dimethylsiloxane units comprise most or all of the remaining units of the polymer and comprise the major proportion of units in the polymer.

Although an advantage of the present invention is in reducing the absorption of PDMS release oil by the fusing roll, a further advantage is that in the polymeric roll coverings of the invention the proportions of dimethylsiloxane units and diphenylsiloxane units can be adjusted so that the polymer absorbs a limited and controlled amount of the oil. The benefit of this is that the roll, in effect, serves as a reservoir for oil in the event of any interruption in the normal supplying of release oil to the surface of the roll. If such oil supply is interrupted, the oil retained by the roll covering prevents any immediate image defects, which would occur with a covering of a totally nonabsorbing polymer such as a fluorocarbon polymer.

Likewise, because of its balanced dimethylsiloxane and diphenylsiloxane content, the entire surface of the roll covering is readily wetted by a reasonably small amount of PDMS release oil. In contrast, a covering such as a fluorocarbon polymer which is more fully incompatible with PDMS oil, requires an excessive amount of the oil to cover its surface. As a consequence of having to use so much oil to obtain toner release, the oil stains the paper on which toner is being fused by the fusing roll.

Thus, through the use of a roll covering which contains 5 to 15 mole percent, and preferably, 8 to 12 mole percent diphenylsiloxane units and the rest principally dimethylsiloxane units, the absorption of a limited amount of PDMS oil in the roll covering is made possible. Furthermore, the roll covering can be wetted with PDMS oil without requiring so much of the oil as to cause staining of the copy paper.

To prepare the base polymer, the monomers yielding the dimethylsiloxane, vinylsiloxane, and diphenylsiloxane units in the noted proportions are mixed with a polymerization catalyst. The mixture is subjected to bulk polymerization at an elevated temperature, e.g., 50° C. to 200° C. and most suitably in the range from 150° to 170° C. until a base polymer having a weight average molecular weight, e.g., from about 300,000 to 500,000 or higher, and preferably approximately 400,000, is obtained. To achieve this degree of polymerization it is usually desirable to maintain the reactants and catalyst in the indicated temperature range for a period of about 1 to 48 hours, preferably 20 to 22 hours.

Useful catalysts for forming the base polymer include catalysts such as potassium trimethylsilanolate and potassium, sodium, or cesium hydroxides. Also useful are the so-called "transient" catalysts such as tetramethylammonium silanolate and n-butyltricyclohexylphosphonium silanolate. The latter are especially useful in forming copolymers of low diphenyl content.

No reaction solvents are necessary when one or more of the monomers is a liquid. Octamethylcyclotetrasiloxane is an example of such a liquid monomer. Suitable solvents when none of the monomers are liquids include aromatic hydrocarbons such as toluene and xylene.

The polysiloxanes of use in this invention can also comprise minor amounts of other organosiloxane units, e.g., other alkylsiloxane units such as diethylsiloxane and other endcapping moieties such as those formed from hexamethyldisiloxane, decamethyltetrasiloxane, 1,3-diphenyltetramethyldisiloxane, and 1,1,5,5-tetraphenyl-1,3,3,5-tetramethyltrisiloxane. It is also possible to blend the base copolymer with other polysiloxanes. For example, if the diphenylsiloxane content of the copolymer is higher than desired, the properties of the final crosslinked polymeric roll cover can be adjusted somewhat by blending the base polymer with a poly(dimethylsiloxane) gum before curing to form the fuser roll cover.

The polymeric covering of the fusing roll of the invention can contain one or more addenda such as fillers and release agents. Examples of useful fillers include alumina, fumed silica, precipitated silica, calcium carbonate and ferric oxide. Silica can be used in a concentration from about 1 to 20 weight percent of the covering to improve the physical strength of the covering. Calcium carbonate in similar concentrations serves the same purpose. Alumina in a concentration from about 30 to 75 weight percent of the covering improves the thermal conductivity of the covering. It is desirably included if the roll is to be internally heated during toner fusing but is not essential if external heating is used. Ferric oxide in amounts from about 1 to 10 weight percent serves as a thermal stabilizer for the polymer. The inorganic fillers, alumina and ferric oxide, also strengthen the polymer and, therefore, when they are used, other strengthening or reinforcing fillers such as silica and calcium carbonate can be eliminated or used in lower concentrations.

Release agents are substances which further reduce the adhesion of toner to the roll covering and can, if desired, be blended with the base polymer in minor concentrations, e.g., 5 to 25 weight percent. Examples include poly(tetrafluoroethylene), boron nitride and fluorinated graphite.

The novel fusing roll of the invention comprises a cylindrical core having a surface covering of the cured elastomer, preferably containing one or more filler substances and, optionally, other addenda. The core comprises any rigid metal or plastic substance. Suitable core materials include aluminum, steel and various alloys and polymeric materials such as thermoset resins, with or without fiber reinforcement.

In accordance with the method of the invention, the fuser roll is fabricated by first preparing a mixture to be used to form the covering. The mixture comprises the base polymer of choice, any other polymers and other addenda, such as inorganic fillers and release agents, desired to be included in the covering (such as described previously herein), and a free radical initiator useful for vinyl-addition-crosslinking of the polymer through the vinyl moieties of the vinylsiloxane structural units of the base polymer. Such initiators are well known and include, for example, dicumyl peroxide, benzoyl peroxide, and 2,5-dimethyl-2,5-di(butylperoxy)hexane.

The ingredients of the mixture are blended together by any convenient means, for example, by milling all the ingredients together on a two-roll mill.

A covering of the mixture, e.g., in sheet form of 0.5 to 2 mm thickness, is then placed on the cylindrical core of choice and molded to the core by any convenient means, but preferably by known techniques of compressing molding using heat and pressure, with the heat being sufficient to cause at least some vinyl-addition-crosslinking of the polymer. In some preferred embodiments, molding is carried out at a pressure of 3.4 MPa and a temperature of 177° C. for 15 minutes.

The covered roll is then cooled, removed from the molding apparatus, and subjected to a further heat treatment sufficient to complete the crosslinking and drive any volatile materials out of the covering. The post-molding heat treatment is preferably carried out, at least in part, at temperatures above 200° C. For example, in some of the preferred embodiments, the post-molding treatment is at 149° C. for 3 hours, then at 177° C. for 3 hours, and then at 204° C. for 16 hours.

If desired, the covered roll can then be ground down to desired diameter by any known technique.

Rolls produced in accordance with the invention have been used as fuser rolls and have been otherwise tested to determine various physical properties thereof. When used as fuser rolls, with application of heat and PDMS release liquids thereto, the rolls have exhibited good fusing performance and durability over long copy runs. Their superior resistance to swelling by PDMS oils has resulted in reduction or elimination of step patterns. Their hardness, resilience, compressibility, tensile strength and resistance to thermal degradation have been found to be acceptable, and their thermal conductivity is superior.

The following preparations and examples are included to illustrate the preparation of some base polymers and the preparation and superior properties of rolls in accordance with the invention in comparison to prior art rolls containing no diphenylsiloxane units in their polymeric coverings. Parts and percentages are by weight unless otherwise specified.

Preparation 1—Base Polymer with Endcapping Vinylsiloxane Units

A polyorganosiloxane base polymer was prepared by blending 399 parts octamethylcyclotetrasiloxane, 119 parts octaphenylcyclotetrasiloxane (to provide 10 mole percent diphenylsiloxane units). 0.09 parts of 1,3-divinyltetramethyldisiloxane endcapping, crosslinking monomer and 0.125 parts of potassium trimethylsilanolate catalyst. After the reaction mixture was heated for 16 hours at 160° C. under a nitrogen atmosphere, 0.64 parts triphenyl phosphite stabilizer in 10 ml of toluene was added. Then a vacuum was applied and the temperature was raised to 200° C. for one hour and then 225° C. for one hour to remove any volatile impurities, such as low molecular weight polymers and cyclic monomers. The gum was cooled to room temperature and collected.

Preparation 2—Base Polymer with Endcapping and Internal Vinylsiloxane Units

A polyorganosiloxane composition containing internal vinyl groups was prepared by blending 399 parts octamethylcyclotetrasiloxane, 119 parts octaphenylcyclotetrasiloxane (to provide 9.9 mole percent diphenylsiloxane units), 0.09 parts 1,3-divinyltetramethyldisiloxane, 5 parts 1,3,5,7-tetravinyltetramethylcyclotetrasiloxane (to provide 1 mole percent internal vinylmethylsiloxane units) and 0.13 parts potassium trimethylsilanolate. After the reaction mixture was heated for 16 hours at 160° C. under a nitrogen atmosphere, 0.64 parts triphenylphosphite stabilizer in 10 ml toluene was added. A vacuum was then applied at 200° C. for one hour and 225° C. for one hour to remove volatile impurities. The gum was cooled to room temperature and then collected.

Examples 1-3—Preparation and Properties of Rolls (a) Compounding of the roll covering Four base polymers were prepared substantially as in Preparation 2, but with each having 0.25 mole percent internal vinylmethylsiloxane units and each having different amounts of diphenylsiloxane units. The base polymer for a control example contained no diphenylsiloxane units and had a weight average molecular weight of 423,000 g/mole. The base polymers for Examples 1, 2 and 3 contained 5, 10, and 15 mole percent diphenylsiloxane units, respectively, and had weight average molecular weights of 399,000; 330,000; and 469,000 respectively. The four different base polymers were compounded with addenda in the following manner. The polymer (175 parts) was placed on a 2-roll mill with 43.8 parts ferric oxide, 481.4 parts alumina and 1.75 parts dicumyl peroxide initiator. The ingredients were milled together at 18° C. and then aged at room temperature overnight. The composition was freshened before molding by passing it through the two-roll mill for five minutes.

(b) Roll formation

Cylindrical aluminum cores were prepared by cleaning them abrasively and washing to remove contaminants. They were then coated with a priming agent. Sheets of the polymers compounded in (a) above were then compression molded to the cleansed cores at 177° C. and 3.4 MPa for 15 minutes and were then further cured at 149° C. for 3 hours, 177° C. for 3 hours, and 204° C. for 16 hours to make test rolls. The roll covers were then ground down to a thickness of about 1.3 mm.

(c) Testing

Duplicate samples of each roll covering were measured for thermal conductivity at 175° C. using a C-matic Model TCHM-LT Thermal Conductivity Instrument from Dynatech R/D Co., Cambridge, Mass., U.S.A. Results are given in watts per meters per degree Celsius (W/m/°C.) in Table I. The samples were then weighed and tested for Shore A hardness (Test D-2240-81 of the American Society of Testing Materials). The samples were then immersed in poly(dimethylsiloxane) release oils at 177° C. for one week, and each sample was then weighed and tested for hardness after immersion. The percent change in weight after immersion indicates the degree of swelling. Results are given in Tables I and II below.

Table I gives the results of immersion of the roll covering in a low viscosity poly(dimethylsiloxane) oil (350 centistokes) and Table II gives results for immersion in a higher viscosity poly(dimethylsiloxane) oil (60,000 centistokes). Swelling is, as evidenced by weight increase, markedly lower in both the low and high viscosity oils when the polymer contains at least 5 mole percent diphenylsiloxane. At the highest concentration of diphenylsiloxane, swelling is negligible. Shore A hardness remains nearly the same before and after immersion for the 10 and 15 mole percent diphenylsiloxane levels. Thermal conductivity of the coverings improved significantly, corresponding to each increase in diphenylsiloxane content.

TABLE I[a]

Immersion in low Viscosity Oil

| Example | Mole % Diphenyl siloxane | Thermal Conductivity (W/m/°C.) | Shore A Hardness: Before Immersion | Shore A Hardness: After Immersion | Shore A Hardness: %Δ | Cover Weight: Before Immersion | Cover Weight: After Immersion | Cover Weight: %Δ |
|---|---|---|---|---|---|---|---|---|
| Control | 0 | .702 | 78 | 64 | −17.9 | 1.831 | 1.961 | 7.1 |
| 1 | 5 | .725 | 77 | 68 | −11.7 | 1.924 | 2.011 | 4.5 |
| 2 | 10 | [b] | 76 | 71 | −6.6 | 1.847 | 1.893 | 2.5 |
| 3 | 15 | .765 | 75 | 74 | −1.3 | 1.804 | 1.812 | 0.4 |

[a]All data are the averages of duplicate samples tested.
[b]Not measured.

TABLE II[a]

Immersion in Higher Viscosity Oil

| Example | Mole % Diphenyl siloxane | Shore A Hardness: Before Immersion | Shore A Hardness: After Immersion | Shore A Hardness: %Δ | Cover Weight: Before Immersion | Cover Weight: After Immersion | Cover Weight: %Δ |
|---|---|---|---|---|---|---|---|
| Control | 0 | 79 | 71 | −10.1 | 1.863 | 1.930 | 3.6 |
| 1 | 5 | 77 | 73 | −5.2 | 1.850 | 1.879 | 1.6 |
| 2 | 10 | 75 | 75 | 0.0 | 1.828 | 1.845 | 0.93 |
| 3 | 15 | 76 | 77 | +1.3 | 1.873 | 1.873 | 0.0 |

[a]All data are the averages of duplicate samples tested.

Although the invention has been described in detail with particular reference to certain preferred embodiments thereof, it should be appreciated that variations and modifications can be effected within the spirit and scope of the invention.

What is claimed is:

1. A roll useful for fusing heat-softenable toner material to a substrate, wherein the roll comprises a cylindrical core having an outer covering comprising a crosslinked elastomeric siloxane copolymer comprising a major proporton of dimethylsiloxane recurring units, from 5 to 15 mole percent diphenylsiloxane recurring units, and more than 0 but less than 5 mole percent vinyl-addition-crosslinked siloxane recurring units.

2. The roll of claim 1, wherein the outer covering further comprises an inorganic filler mixed with the siloxane copolymer.

3. The roll of claim 2, wherein the inorganic filler comprises alumina and ferric oxide.

4. The roll of claim 1, wherein the diphenylsiloxane recurring units comprise from 8 to 12 mole percent of the siloxane copolymer.

* * * * *